United States Patent [19]

Yearout

[11] Patent Number: 4,808,199

[45] Date of Patent: Feb. 28, 1989

[54] APPARATUS AND METHOD FOR PROTECTING GAS SEPARATION MEMBRANES FROM DAMAGE DUE TO A REVERSAL OF DIFFERENTIAL PRESSURE

[75] Inventor: Jacob S. Yearout, Houston, Tex.

[73] Assignee: W. R. Grace & Co.-Conn., New York, N.Y.

[21] Appl. No.: 32,826

[22] Filed: Mar. 31, 1987

[51] Int. Cl.[4] .............................................. B01D 53/22
[52] U.S. Cl. ......................................... 55/16; 55/158; 55/312; 137/541
[58] Field of Search .................... 55/16, 158, 309–314; 137/541; 210/130

[56] References Cited

U.S. PATENT DOCUMENTS

| | | | |
|---|---|---|---|
| 1,195,983 | 8/1916 | Farmer | 55/311 |
| 2,608,210 | 8/1952 | St. Clair | 137/541 |
| 2,870,576 | 1/1959 | Parker | 137/541 X |
| 3,001,546 | 9/1961 | Salisbury | 137/541 |
| 3,314,542 | 4/1967 | Kudlaty | 210/130 |
| 3,335,751 | 8/1967 | Davis, Jr. | 137/541 |
| 3,542,057 | 11/1970 | Staiano | 137/541 X |
| 3,668,837 | 6/1972 | Gross | 55/158 |
| 4,099,540 | 7/1978 | Papp | 210/130 X |
| 4,130,403 | 12/1978 | Cooley et al. | 55/16 |
| 4,134,742 | 1/1979 | Schell | 55/16 |
| 4,190,426 | 2/1980 | Ruschke | 55/310 X |
| 4,279,746 | 7/1981 | Leutz | 210/130 |
| 4,298,358 | 11/1981 | Ruschke | 55/310 X |
| 4,334,993 | 6/1982 | Norton | 55/158 X |
| 4,431,023 | 2/1984 | Johnson | 137/541 X |

FOREIGN PATENT DOCUMENTS 919898  2/1963  United Kingdom ............... 210/130

OTHER PUBLICATIONS

Farris Brochure, (including Groth Products and Services Bulletin HCP-794), Catalog No. FE-80-100.

*Primary Examiner*—Robert Spitzer
*Attorney, Agent, or Firm*—Vincent L. Fabiano; David E. Heiser; William W. McDowell, Jr.

[57] ABSTRACT

An improved method for using a membrane to separate gases provides for relieving the pressure on the permeate side of the membrane when the permeate pressure exceeds the feed pressure by a selected amount. Gas separation apparatus in general and, in particular, spiral wound membrane units are improved by providing for relief of such reversed pressure differentials. A suitable device for relieving the reversed pressure differential includes a body, a poppet movably mounted to the body and biased to a closed position until the selected pressure differential is reached, and a seal for preventing gas flow through the device when the poppet is closed.

29 Claims, 2 Drawing Sheets

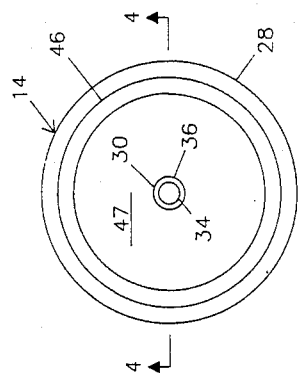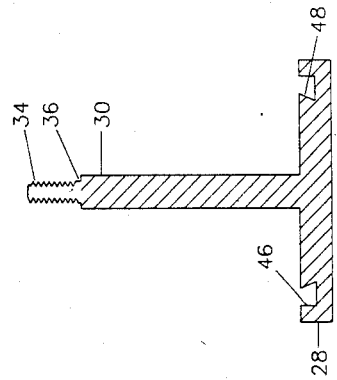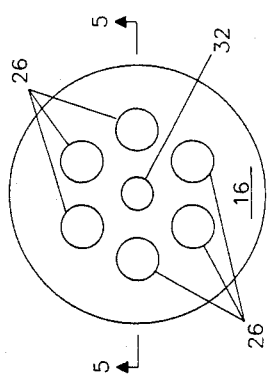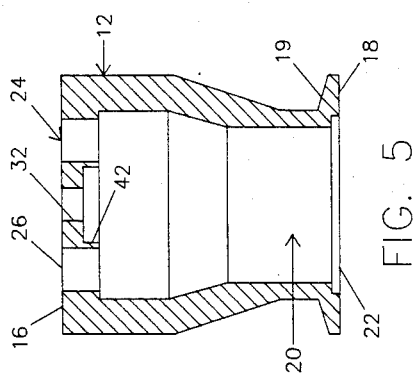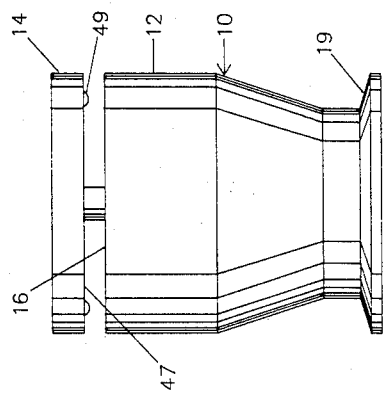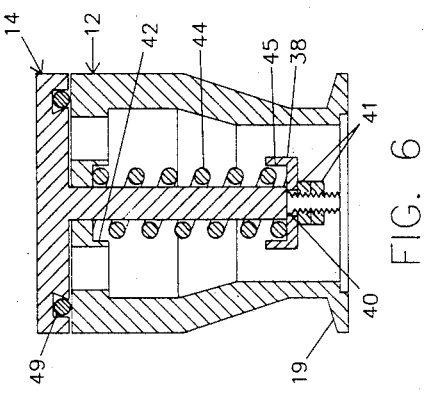

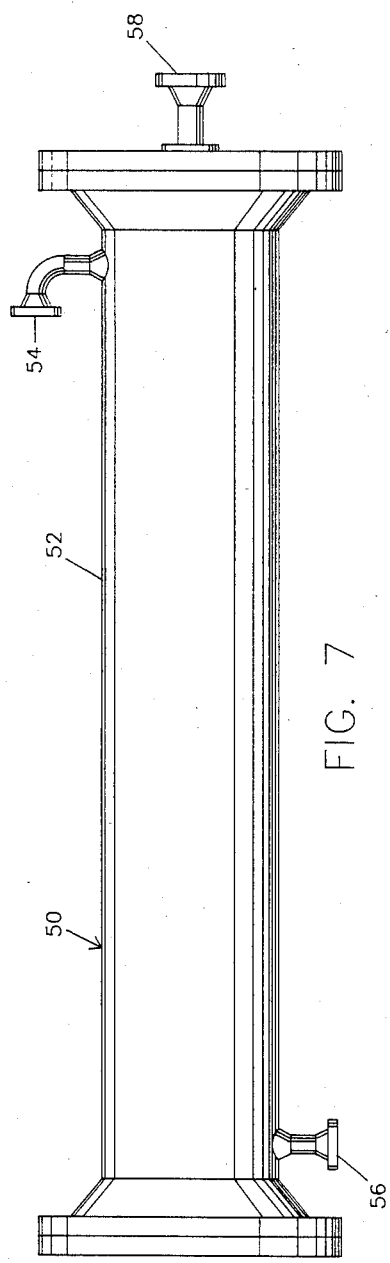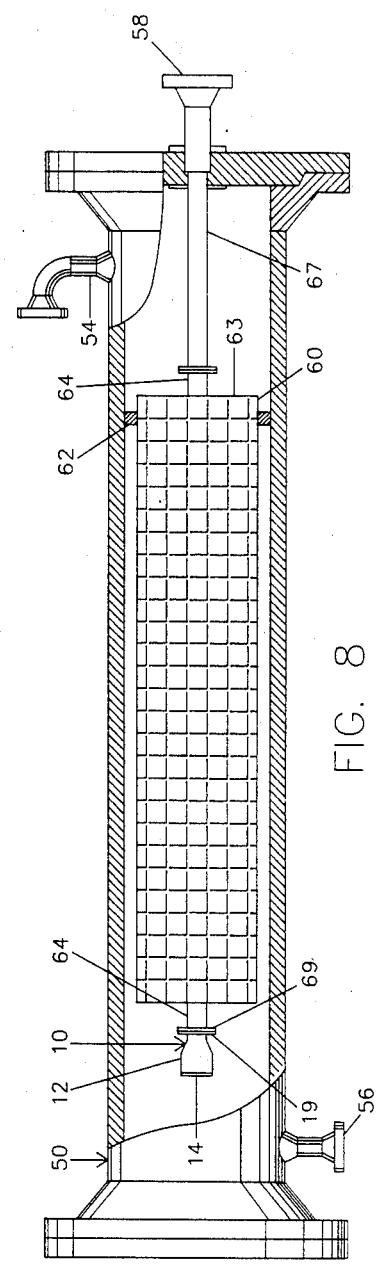

APPARATUS AND METHOD FOR PROTECTING GAS SEPARATION MEMBRANES FROM DAMAGE DUE TO A REVERSAL OF DIFFERENTIAL PRESSURE

FIELD OF THE INVENTION

This invention relates to providing protection of gas separation membranes from reverse pressure differentials in the gas separation system, and more particularly, to providing a relief means for relieving the pressure on the permeate side of a gas separation membrane when the permeate side pressure exceeds the pressure on the feed side of the membrane by a selected amount.

BACKGROUND OF THE INVENTION

The use of membranes for gas separation is becoming increasingly more common. In these systems, a mixture of gases under relatively high pressure are passed across the surface of a membrane adapted to act as a selective barrier, permitting some components of the gas mixture to pass through more readily than others. The separation of gases in these processes is generally due to molecular interaction between the gaseous components of the feed stream. Because different components interact differently with the membrane, their transmission rates through the membrane are different, and substantial separation of components can be effected. While a certain selective effect can result from free molecular diffusion through membrane pores, especially in the case of small gas molecules such as hydrogen and helium, membrane separation is often considered to proceed principally by the sorption of a gaseous component on the feed side of the membrane, diffusion of that component through the membrane, and desorption of the component from the permeate side of the membrane. Membranes used for gas separation processes wherein the separation mechanism is controlled principally by solubility and diffusivity, as opposed to molecular diffusion, are classified as nonporous membranes. While these nonporous membranes do in fact have small pores, they are typically produced in a carefully regulated manner to provide a dense layer which effectively controls the gas transfer in the system. The structure of this dense control layer is often crucial to membrane performance, and it can be adversely affected by such factors as moisture, chemical degradaton, or physical deformation.

Gas transfer through nonporous membranes is dependent upon the membrane surface area, the pressure differential across the membrane, the diffusion rate of the gaseous components, and the effective thickness of the membrane. Generally, the membrane layer through which the gases must diffuse should be as thin as possible in order to obtain the maximum amount of gaseous diffusion. However, the membrane thinness is limited by a need to have a membrane free from defects, such as pinholes, and the need to have a membrane which has the physical integrity to withstand pressures as high as about 4,000 pounds per square inch-gauge (psig) through the membrane. For example, asymmetric cellulose ester membranes can be produced which do have a very thin but dense (nonporous) layer and a supporting sublayer of larger pore size. The thin dense layer basically controls the mass transfer in the system, and the thicker sublayer provides a degree of structural integrity. Many types of membranes, including cellulose esters and polymeric membranes, such as silicate rubber, polyethylene and polycarbonate, may be employed in gas separation. However, the particular membrane used can depend upon the separation sought to be effected.

Commerical gas separation processes are generally continuous areas in which a feed gas stream is brought into contact at the feed side of a membrane. The pressure on the feed side of the system is maintained at a pressure sufficiently higher than the pressure on the permeate side of the membrane to provide a driving force for the diffusion of the most permeable components of the gaseous mixture through the membrane. The partial pressure of the more permeable gaseous components is also maintained at a higher level on the feed side of the membrane than on the permeate side by constantly removing both the permeate stream and the residue of the feed stream from contact with the membrane. While the permeate stream can represent the desired product, in most gas permeation processes the desired product is the residue stream, and the permeate stream consists of contaminants which are removed from the feed stream.

For example, $CO_2$ and $H_2S$ can be removed from a hydrocarbon mixture, such as natural gas, using a thin dried supported cellulose ester membrane, and a differential pressure across the membrane of about 100 psi. The partial pressures of $CO_2$ and $H_2S$ in the permeate stream are preferably kept at about 80 percent or less of the partial pressure of those same components in the feed stream by separately and continuously removing the depleted feed gas (residue) stream and the permeate stream from contact with the membrane. The residue stream can, of course, be fed to another gas separation membrane stage, and the permeate gas stream can likewise be fed to another separation stage to produce a product having a still higher concentration of the more permeable products. In fact, the use of multiple separation steps in series and/or in parallel offers considerable diversity in separation alternatives using membrane technology so long as sufficient pressures can be maintained in the system. Feed stream pressures can vary from 10 to 4,000 psig, but are generally within the range of about 500 psig to about 3,000 psig. The differential pressure across the membrane can be as low as about 10 pounds per square inch (psi) or as high as about 2,100 psi depending on many factors, such as the particular membrane used, the flow rate of the inlet stream, and the availability of a compressor to compress the permeate stream, if such compression is desired. A differential pressure of at least 100 psi is preferred since lower differential pressure may require more modules, more time, and compression of intermediate product streams of modules arranged in series. Differential pressures of 1,200 psi or less are also generally preferred since the useful lfe of membranes is generally greater. Differential pressures greater than about 2,100 psi may rupture the membrane. Although additional membrane support may be provided by porous metal or plastics, these materials can significantly affect the size of the system, and they can also create additional problems of compatibility, especially under conditions where they expand or contract to a different degree than the membrane itself.

Spiral wound membrane arrangements are becoming more commonly used in commercial gas separation processes. An advantage of using a spiral wound technique is that this affords a large membrane contact area while permitting a rather small overall containment vessel. A standard way of supplying spiral wound membranes for commercial use is in the form of membrane units which comprise a section of permeate conduit around which the membrane is wound. These membrane units may then be used singly or joined together in series by interconnecting their permeate conduit sections. The usual way to use spiral wound membrane units is to contain them, either singly or multiply in modules. The modules can then in turn be used singly or can be conveniently interconnected in series or parallel arrangements to provide the desired treatment.

The useful life of gas separation membranes, including in particular spiral wound membranes, has not been entirely predictable. Various factors are believed to affect the performance of membranes over time. These include the normal operating pressure differentials, the character of the gas being treated, and the quality of the membrane itself. Membranes can also degrade naturally over time. A continuing challenge for those seeking to use gas separation membrane systems has been to improve the reliability of membrane systems, especially by prolonging the useful life of the membranes used therein.

It has now been observed that although membranes are designed to withstand considerable pressure differential where the feed side pressure exceeds the permeate side pressure, their asymmetric structure, especially when spirally wound, makes them more succeptible to damage when system pressure is reversed. For example, spiral wound elements which ae designed to withstand 1,200 psi differential pressure during normal operation, have been adversely affected by relatively small reverse pressure differentials. Indeed, permeate pressures which exceed feed pressures by more than 5 psi have severely damaged, or even ruptured, membrane elements. These reverse pressure conditions may occur instantaneously, or otherwise, particularly in high pressure systems, due to plant upset.

SUMMARY OF THE INVENTION

An improved method has been found for using a membrane to separate gases in a mixture of feed gases by feeding the mixture across the feed side of the membrane at a gas pressure which is generally higher than the pressure on the permeate side of the membrane. The improvement comprises the step of providing relief means for relieving the pressure on the permeate side of the membrane when the permeate side pressure exceeds the pressure on the feed side of the membrane by a selected amount. The membrane of a gas separation membrane system can be protected from damage due to a reversal in differential pressure by incorporating between the permeate side of the membrane and the feed side of the membrane relief means for relieving the pressure on the permeate side of the membrane when it exceeds the pressure on the feed side of the membrane by a selected amount.

A suitable device for relieving the reversed pressure differential is disclosed. The device comprises a body having a first end, a second end, and a continuous passage running from an inlet at the second end to an outlet at the first end; a poppet having a head sized to cover the passage outlet, said poppet movably mounted to the body such that it has a closed position where the head portion covers the passage outlet, and an open position where gas may pass through the passage when the body is secured between the permeate side and the feed side of the membrane with the passage inlet in communication with the permeate side of the membrane and the passage outlet in communication with the feed side of the membrane, thereby relieving any differential between the permeate side pressure and the feed side pressure; biasing means for biasing the poppet to the closed position when the permeate side pressure does not exceed the pressure on the feed side by the selected amount, and for allowing the poppet to move to its open position when the permeate side pressure exceeds the pressure on the feed side of the membrane by the selected amount; and sealing means for substantially preventing the flow of gas through the passage when the poppet is in its closed position.

Relief means such as this disclosed device may be used to improve gas separation apparatus, in general, and in particular, to improve spiral wound membrane units. Moreover, pre-existing operational systems may be backfitted with such relief means.

It is an object of this invention to provide a method for protecting membrane gas separation apparatus from damage due to a reversal in differential pressure in the system.

It is a further object of this invention to increase the reliability of gas separation membrane systems.

It is another object of this invention to provide a device which can be used to relieve pressure when a reversal in pressure differential threatens to damage gas separation membranes.

It is yet another object of this invention to provide relief from a reversal in differential pressure in gas separation membrane systems while controlling the escape of permeate gas from the system.

Further objects, features, and advantages of the invention will be apparent from the following detailed description when taken in conjunction with the accompanying drawings.

BRIEF DESCRIPTION OF THE DRAWINGS

In the drawings
FIG. 1 is an elevational view of a device of this invention with its poppet in the open position FIG. 2 is a plan view of the first end of the body of the device shown in FIG. 1.

FIG. 3 is a plan view of the poppet of the device shown in FIG. 1. from its stem side.

FIG. 4 is a longitudinal sectional view of the poppet taken along the section line 4—4 of FIG. 3.

FIG. 5 is a longitudinal sectional view of the body taken along section line 5—5 of FIG. 2.

FIG. 6 is a longitudinal sectional view of the device of FIG. 1 with its poppet in the closed position and the body positioned as in FIG. 5.

FIG. 7 is an elevational view of an improved gas separation apparatus of this invention.

FIG. 8 is a partially sectioned view of the separation apparatus of FIG. 7 showing a membrane unit and a relief device installed therein.

DESCRIPTION OF THE PREFERRED EMBODIMENT

An improved method has now been found for using a membrane to separate gases in a mixture of feed gases by feeding the mixture across the feed side of the membrane at a gas pressure which is generally higher than the pressure on the permeate side of the membrane. The improvement comprises the step of providing relief means for relieving the pressure on the permeate side of the membrane when the permeate side pressure exceeds the pressure on the feed side of the membrane by a selected amount. The selected amount of reversal in differential pressure at which the permeate side pressure is relieved is dependent upon such factors as the tolerance of the membrane material and the precision and accuracy of the relief means. Preferably, the relief means provides for relief of permeate side pressure before the reversal of differential pressure across the membrane reaches 5 psi. The improvement increases the reliability of the gas separation membrane system by protecting the membrane from damage due to a reversal in differential pressure. The improvement is particularly useful in systems where backpressure buildup and/or feed pressure loss is common such that there is an occasional reversal in differential pressure in the system. A preferred use of the improvement is for systems employing nonporous membranes, especially asymmetric nonporous membrane (i.e., those in which there are layers of relatively dense and relatively porous material). Most preferably, the improvement is used in systems where the nonporous membranes are spirally wound. It is also preferable that the pressure relief means is incorporated between the permeate side of the membrane and the feed side of the membrane. The escape of permeate gas from the system is thus controlled.

Referring now more particularly to the drawings, wherein like numbers refer to like parts throughout the sectional views, a device for relieving the pressure on the permeate side of a gas separation membrane in accordance with this invention, when the permeate side pressure exceeds the pressure on the feed side of said membrane by a selected amount, is shown generally as (10) in FIG. 1. The device (10) comprises a body (12), and a poppet (14). As best shown in FIG. 5, the body (12) has a first end (16), a second end (18), and a continuous passage (20), running from an inlet (22) at the second end to an outlet (24) at the first end. In the embodiment illustrated, the outlet (24) includes six first end bores (26). As shown in FIG. 3, the poppet (14) includes a head portion (28). The head portion (28) is sized to cover the outlet (24), including all of the bores (26). As shown in FIG. 6, the poppet is movably mounted to the body such that it has a closed position, as illustrated in FIG. 6, where the head portion (28) covers the passage outlet (24), and an open position, as illustrated in FIG. 1.

Preferably, the poppet also includes a cylindrical stem (30) and the body has a cylindrical aperture (32) adapted to receive the poppet stem (30) such that poppet (14) is slidably mounted to the body (12), the stem sliding within the aperture as the poppet moves between its open and closed positions. In the preferred embodiment, a threaded peg (34) is provided at the end of stem (30). The peg (34) has a smaller diameter than the stem (30) such that a lip (36) is formed at the junction of the peg to the stem. As illustrated in FIG. 6, a retainer (38) having a central aperture (40) sized large enough to allow the peg (34) to pass through, but small enough to prevent the stem from passing through, may be fastened to the poppet after the stem is inserted through the body aperture (32). The retainer (38) as shown may be held against the lip (36) by threaded lock nuts (41), and is also preferably sized to prevent the poppet from completely withdrawing through the body aperture (32).

Biasing means are provided for biasing the poppet to its closed position. In the preferred embodiment illustrated herein, the body (12) has a first spring cavity (42) which is concentric with aperture (32) and is adapted to receive one end of coil spring (44), and the retainer (38) is shaped to provide a second spring cavity (45) which is adapted to receive the other end of said coil spring. The spring coil has a diameter sized to allow the stem (30) to pass within as the poppet moves between its open and closed positions. In assembling the device (10), the poppet stem (30) is placed through the body aperture (32), the spring (44) is then placed around the stem (30). The retainer (38) may then be fastened in place at lip (36) using lock nuts (41). It will be evident that the compression of the spring (44) can be adjusted by withdrawing the lock nuts (41) a selected amount along peg (34) and allowing the retainer to move away from the lip (36). Other biasing means, such as leaf springs or elastic elements, will be evident to those skilled in the art and are considered to be within the scope of this invention.

Sealing means are also provided for substantially preventing the flow of gas through the passage (20) when the poppet (14) is in its closed position. In the preferred embodiments, the head portion (28) has a circular groove (46) positioned to overlap a portion of the first end (16) of body (12) which entirely surrounds passage outlet (24), including all of the bores (26). The groove (46) has a notch (48) and a selected depth which allows resilient O-ring (49) to be snapped within the groove and to project outward to sealingly engage the first end (16) when the poppet (14) is in its closed position. The length of spring (44) is chosen such that, unless there is significant external force urging the poppet to its open position, there is sufficient spring compression to hold the poppet in its closed position with the O-ring sealed against the first end (16) to substantially prevent the flow of gas through the passage. Other sealing means, such as an impervious gasket cemented at an appropriate position on the periphery of the first end (16), will be evident to those skilled in the art and are considered to be included within the scope of this invention.

The biasing means such as spring (44) is also chosen such that when the body is secured between the permeate side and the feed side of the membrane, the poppet remains in its closed position when the permeate side pressure does not exceed the pressure on the feed side by a selected amount; and when the permeate side pressure exceeds the pressure on the feed side of the membrane by the selected amount, the poppet is allowed to move to its open position where gas may pass through the passage (20) to relieve the differential pressure. It is evident then that when the permeate side pressure does exceed the feed side pressure by said selected amount, the pressure of the gas in the passage (20) will provide sufficient force against the head portion (28) of poppet (14) to overcome the bias provided by spring (44) and move the poppet into its open position.

As best shown by FIGS. 1, 3, 4, and 6, the head portion (28) of the preferred poppet is disklike, having a circular covering surface (47), which is positioned toward the first end (16) of the body (12), and the preferred poppet stem (30) is cylindrical and extends at a right angle from the center of the covering surface (47). The surface of the body (12) at its first end (16) is preferably flat, such that the portion of the first end contacted by O-ring (49) when the poppet is in its closed position is substantially coplaner. This provides for a substantially uniform seal when the O-ring (49) is compressed between poppet head portion (28) and the body first end

(16) of the body. It is also preferable if the passage outlet (24) is symmetric with respect to the covering surface (47) to facilitate a uniform gas flow through outlet (24) when the poppet is opened under pressure. Thus, as illustrated in FIG. 2, the outlet of the preferred embodiment includes the six bores (26) adapted for symmetric positioning around the center of the covering surface (47) of poppet head (28).

Relief devices, including the heretofor described device (10), may be installed on pre-existing gas separation membrane systems to protect the membranes in those systems from damage when the pressure on the permeate side of the membrane exceeds the pressure on the feed side of the membrane by a selected amount. Indeed, the method of achieving such protection by backfitting operational systems with such relief means as device (10) is considered within the invention. The preferred method includes incorporating the device (10) by securing its body between the permeate side of the membrane and the feed side of the membrane with the passage inlet in communication with the permeate side of the membrane and the passage outlet in communication with the feed side of the membrane when the poppet is in its open position.

Relief means for relieving the pressure on the permeate side of a gas separation membrane when the permeate side pressure exceeds the pressure on the feed side of the membrane by a selected amount, such as device (10), may be advantageously incorporated into gas separation apparatus, particularly modules containing spirally wound membranes, to provide an improved apparatus wherein the membrane is substantially protected against damage from a reversal in differential pressure. A preferred embodiment is shown in FIGS. 7 and 8 in more detail. A module (50) is shown in FIG. 7 which comprises a containment vessel (52) having a feed gas inlet port (54), a residual outlet port (56), and a permeate outlet port (58). FIG. 8 shows the general internal structure of the module (50). The module (50) contains the spiral wound membrane unit (60) and a gasket structure (62) which acts both as a support for the membrane unit (60) and as a barrier to force feed gas entering through inlet port (54) into the membrane unit (60). The membrane unit (60) shown in FIG. 8 represents a typical unit in which a membrane (63) is spirally wound about a permeate conduit (64). The gases which pass through the membrane travel to the inward end of the spiral wind whereat they enter the permeate conduit (64) through openings therein (not shown). Various known spacing structures, such as Tricot products, are used within the spiral structure to permit the flow of permeate toward the conduit. Such spacing structures consist of a fine mesh material with open channels. The material can be a polypropylene, a polyester, or similar polymeric material. There is also a spacing structure on the feed side of the membrane to permit the flow of gas into and through the spirally wound structure. This exterior spacer can also be made of a polymeric material, such as polypropylene. Vexar netting is an example of such a product. Reference is made to U.S. Pat. No. 4,134,742, which is hereby incorporated herein in its entirety, for further description of a spirally wound gas separation element. In any case, this structure allows permeate gas to enter the permeate conduit (64) through the aforementioned holes (not shown) in the permeate tube located within the membrane unit. The residual gas passes from the membrane unit into the containment vessel on the residual side of the gasket. The residual gas may then exit the module (50) through outlet port (56).

In practice the pressure drop across the gasket barrier (62) between the feed gas and the residual gas is relatively small, generally only a few psi, and the feed gas pressure is considered substantially equivalent to the residual gas pressure. On the other hand, the operating pressure drop from both the feed gas and residual gas streams to the permeate gas stream in gas separation systems is normally at least 10 psi, is generally from 100 psi to 1,200 psi, and in some membrane systems can be up to about 2,100 psi. Both the feed stream and the residual stream are considered to be on the feed side of the membrane, as opposed to the permeate stream which is located on the opposite side of the membrane. As shown in FIG. 8, the device (10) is mounted on the permeate conduit (64) of membrane unit (60) with the body (12) secured to said permeate conduit between the permeate side and the feed side of the membrane. The passage inlet is in communication with the permeate side of the membrane through permeate conduit (64). The poppet (14) is shown in FIG. 8 in its closed position. Clearly, should the poppet shown in FIG. 8 move into its open position, the passage outlet of body (12) will come into communication with the feed side of the membrane, allowing gas to flow through the body passage.

Operation of the device (10) in FIG. 8 is exemplified as follows. As described above under normal operation, the feed side pressure (i.e., the gas pressure at the residual outlet port) is considerably greater than the permeate side pressure (i.e., the pressure within the permeate conduit). The spirally wound membrane unit (60) is constructed to withstand these conditions and should then function normally. Under such conditions, the poppet is held in its closed position by a biasing means such as spring (44) shown in FIG. 6, as well as by the operating pressure differential itself. However, should the permeate side pressure be augmented as by accidental development of back pressure in the system, or alternatively, should the feed side pressure be lowered as by a leak in the feed system, a reversal in the differential pressure could develop such that the permeate side pressure becomes geater than the feed side pressure. It has now been found that even a nominal reversal in differential pressure, on the order of 5 psi, can threaten the structural integrity of some spirally wound membrane systems. Membrane damage can be avoided by providing the device (10) with a biasing means that allows the poppet (14) to open and relieve the differential pressure when the permeate side pressure exceeds the feed side pressure by an appropriately selected amount. A device wherein the poppet (14) moves to its open position when the permeate side pressure exceeds the feed side pressure by about 1 psi is particularly preferred because it protects even fragile membranes and it allows for some pressure variation along the feed side of the membrane as the gas moves from the feed end to the residual end of the membrane.

It will be evident that in appropriately sized containment vessels, several (e.g. six) membrane units such as that shown at (60) in FIG. 8, each comprising a permeate conduit such as that shown as (64) with a membrane (63) spirally wound thereabout, may be linked in series by sequentially connecting the ends of the permeate conduits. Gasket barriers such as that shown at (62) in FIG. 8 can be provided with each unit. Alternatively, a tubular, smooth liner (not shown) can be provided within the containment vessel and sealed therein in a manner similar to that shown for the membrane unit at (60) in FIG. 8, such that the several membrane units can be snugly inserted within the liner with their permeate conduits linked in series and their outer surfaces adequately sealed against the inner surface of the liner. In any case, the forwardmost permeate conduit is linked as through tube (67) in FIG. 8 with the permeate outlet port such as that shown as (58) in FIG. 8 and, since the permeate conduits are interconnected, only the rearwardmost membrane unit need be provided with a relief device. Membrane units so fitted with relief devices are considered improved apparatus within the scope of this invention. In the preferred embodiment as shown in FIG. 8, the device (10) is fitted to the permeate conduit (64) of the membrane unit (60).

As best illustrated by FIGS. 1 and 6, the second end (18) of the preferred body (12) is flat, and as best shown in FIG. 8, is preferably designed to address the end flange (69) of a permeate conduit. An annular resilient seal (not shown) may then be placed between the second end (18) and the end flange (69) and the device (10) may be secured to the permeate conduit (64) in substantially airtight manner using clamps (not shown) which engage rim (19) of the body and the flange rims of the permeate conduit. The rim (19) is one means for securing the second body end (18) of device (10) to a permeate conduit. Other means for securing the second body end of the device to a permeate conduit, such as threaded connections designed to mate with a threaded conduit end, will be evident to those skilled in the art and are considered to be within the scope of this invention.

The improved membrane unit and module may use cellulose acetate membranes such as those described in the above-referenced U.S. Pat. No. 4,134,742, or other membrane materials known in the art to be suitable for use in gas separation systems. This includes not only various other cellulose esters, but also other polymeric materials.

The body (12) and poppet (14) of the device are constructed of material which is able to withstand the pressure differentials described, is resistent to chemical attack by gases in the system, and is essentially impervious to gas. Stainless steel is a preferred material. The retainer (38) and lock nuts (41) and spring may also be constructed of stainless steel. The O-ring should also be resistent to chemical attack by gases and substantially impervious to gas. A suitable device for use in commercial gas separation modules employing spirally wound membrane units can be sized within a maximum external diameter of about three inches and a height of about 3.5 to 3.75 inches. The six bores (26) of such an embodiment are each preferably about one-half inch in diameter, with portions of the body passage (20) other than the outlet being larger, as illustrated by FIGS. 5 and 6. Such a device may suitably employ a type 302 stainless spring such as Part No. LC-072K-7 distributed by Lee Springs, Inc., and a resilient O-ring of Desogrin compound, such as part No. A5568-331 distributed by Desogrin Industries of Manchester, N.H. Other suitable materials are available and will be evident to those skilled in the art. In any case, each device is preferably tested before installation to confirm that the poppet does move to its open position when the selected pressure difference is exceeded.

It is understood that the invention is not confined to the particular construction, arrangement of parts, steps, or materials herein illustrated and described, but embraces all such modified forms thereof as come within the scope of the following claims.

What is claimed is:

1. An improved method for using a membrane to separate gases in a mixture of feed gases by feeding said mixture across the feed side of the membrane at a gas pressure which is generally higher than the pressure on the permeate side of the membrane, the improvement comprising the step of providing relief means for relieving the pressure on the permeate side of the membrane when the permeate side pressure exceeds the pressure on the feed side of the membrane by a selected amount.

2. The improved method of claim 1 wherein the method improved uses a nonporous membrane.

3. The improved method of claim 1 wherein the method improved uses an asymmetric membrane.

4. The improved method of claim 1 wherein the method improved uses a spirally wound membrane.

5. The improved method of claim 1 wherein the improvement comprises backfitting an operational system with said pressure relief means.

6. The improved method of claim 1 wherein the pressure relief means is incorporated between the permeate side of the membrane and the feed side of the membrane.

7. The improved method of claim 1 wherein the relief means includes a device comprising
    (a) a body having a first end, a second end, and a continuous passage running from an inlet at the second end to an outlet at the first end;
    (b) a poppet having a head sized to cover the passage outlet, said poppet movably mounted to the body such that it has a closed position where the head portion covers the passage outlet, and an open position where gas may pass through the passage when the body is secured between the permeate side and the feed side of the membrane with the passage inlet in communication with the permeate side of the membrane and the passage outlet in communication with the feed side of the membrane, thereby relieving any differential between the permeate side pressure and the feed side pressure;
    (c) biasing means for biasing the poppet to the closed position when the permeate side pressure does not exceed the pressure on the feed side by the selected amount, and for allowing the poppet to move to its open position before the permeate side pressure exceeds the pressure on the feed side of the membrane by 5 psi; and
    (d) sealing means for substantially preventing the flow of gas through the passage when the poppet is in its closed position.

8. The improved method of claim 7 wherein the method improved uses a spiral wound membrane unit having a membrane spirally wound about a permeate conduit; and wherein the second body end of the device is secured to the permeate conduit of said membrane unit.

9. A method of protecting the membrane of a gas separation membrane system from damage due to a reversal in differential pressure comprising incorporating between the permeate side of the membrane and the feed side of the membrane relief means for relieving the pressure on the permeate side of the membrane when the permeate side pressure exceeds the pressure on the feed side of the membrane by a selected amount.

10. The method of claim 9 wherein the relief means includes a device comprising
(a) a body having a first end, a second end, and a continuous passage running from an inlet at the second end to an outlet at the first end;
(b) a poppet having a head sized to cover the passage outlet, said poppet movably mounted to the body such that it has a closed position where the head portion covers the passage outlet, and an open position where gas may pass through the passage when the body is secured between the permeate side and the feed side of the membrane with the passage inlet in communication with the permeate side of the membrane and the passage outlet in communication with the feed side of the membrane, thereby relieving any differential between the permeate side pressure and the feed side pressure;
(c) biasing means for biasing the poppet to the closed position when the permeate side pressure does not exceed the pressure on the feed side by the selected amount, and for allowing the poppet to move to its open position before the permeate side pressure exceeds the pressure on the feed side of the membrane by 5 psi; and
(d) sealing means for substantially preventing the flow of gas through the passage when the poppet is in its closed position.

11. The method of claim 10 wherein the poppet has a stem and the body has an aperture to receive the stem such that the stem slides within the aperture as the poppet moves between its open and its closed positions; wherein the head portion of the poppet is disklike with a circular covering surface positioned toward the first end of the body; wherein the poppet stem is cylindrical and extends at right angle from the center of said covering surface; wherein the outlet is symmetrical with respect to the covering surface; wherein the sealing means comprises a resilient O-ring attached at the covering surface such that when the poppet is in its closed position, the O-ring is compressed between the poppet head portion and a portion of the first end of the body which surrounds the outlet; and wherein the portion of the first end contacted by the O-ring when the poppet is in its closed positon is substantially coplaner such that the seal is substantially uniform.

12. The method of claim 9 wherein the relief means includes a device comprising:
(a) a body haivng a first end, a second end, and a continuous passage running from an inlet at the second end to an outlet at the first end;
(b) a poppet having a head sized to cover the passage outlet, said poppet movably mounted to the body such that it has a closed position where the head portion covers the passage outlet, and an open position where gas may pass through the passage when the body is secured between the permeate side and the feed side of the membrane with the passage inlet in communication with the permeate side of the membrane and the passge outlet in comminucaiton with the feed side of the membrane, thereby relieving any differential between the permeate side pressure and the feed side pressure;
(c) biasing means for biasing the poppet to the closed position when the permeate side pressure does not exceed the pressure on the feed side by the selected amount, and for allowing the poppet to move to its open position when the permeate side pressure exceeds the pressure on the feed side of the membrane by the selected amount; and
(d) sealing means for substantially preventing the flow of gas through the passage when the poppet is in its closed position.

13. The method of claim 12 wherein the poppet has a stem and the body has an aperture to receive the stem such that the stem slides within th aperture as the poppet moves between its open and its closed positions.

14. The method of claim 13 wherein the head portion of the poppet is disklike with a circular covering surface positioned toward the first end of the body; wherein the poppet stem is cylindrical and extends at right angle from the center of said covering surface; and wherein the outlet is symmetrical with respect to the covering surface.

15. The method of claim 14 wherein the sealing means comprises a resilient O-ring attached at the covering surface such that when the poppet is in its closed position, the O-ring is compressed between the poppet head portion and a portion of the first end of the body which surrounds the outlet; and wherein the portion of the first end contacted by the O-ring when the poppet is in its closed position is substantially coplaner such that the seal is substantially uniform.

16. An improved gas separation membrane unit comprising a permeate conduit and a gas separation membrane spirally wound thereabout, the improvement comprising a relief device secured to the permeate conduit for relieving the pressure on the permeate side of said membrane when the permeate side pressure exceeds the pressure on the feed side of said membrane by a selected amount without damaging the membrane.

17. The improved gas separation membrane unit of claim 16 wherein the relief device comprises:
(a) a body secured to the permeate conduit and having a first end, a second end and a continuous passage running from an inlet at the second end where it is in communication with the permeate side of the membrane to an outlet at the first end;
(b) a poppet having a head sized to cover the passage outlet, said poppet movably mounted to the body such that it has a closed position where the head portion covers the passage outlet, and an open position where the outlet comes into communication with the feed side of the membrane and gas may pass through the passage, thereby relieving any differential between the permeate side pressure and the feed side pressure;
(c) biasing means for biasing the poppet to the closed position when the permeate side pressure does not exceed the pressure on the feed side by the selected amount, and for allowing the poppet to move to its open position when the permeate side pressure exceeds the pressure on the feed side of the membrane by the selected amount; and
(d) sealing means for substantially preventing the flow of gas through the passage when the poppet is in its closed position.

18. The improved gas separation membrane unit of claim 17 wherein the poppet has a stem and the body has an aperture to receive the stem such that the stem slides within the aperture as the poppet moves between its open and its closed positions; wherein the head portion of the poppet is disklike with a circular covering surface positioned toward the first end of the body; wherein the poppet stem is cylindrical and extends at right angle from the center of said covering surface;

wherein the outlet is symmetrical with respect to the covering surface; wherein the sealing means comprises a resilient O-ring attached at the covering surface such that when the poppet is in its closed position, the O-ring is compressed between the poppet head portion and a portion of the first end of the body which surrounds the outlet; and wherein the portion of the first end contacted by the O-ring when the poppet is in its closed positon is substantially coplaner such that the seal is substantially uniform.

19. The improved gas separation membrane unit of claim 18 wherein the relief device relieves the pressure before the amount by which the permeate side pressure exceeds the pressure on the feed side of the membrane reaches 5 psi.

20. The improved gas separation membrane unit of claim 19 wherein the membrane unit improved uses an asymmetric, nonporous membrane.

21. The improved gas separation membrane unit of claim 17 wherein the biasing means allows the poppet to move to its open position before the amount by which the permeate side pressure exceeds the pressure on the feed side reaches 5 psi.

22. The improved gas separation membrane unit of claim 17 wherein the biasing means allows the poppet to move to its open position when the permeate side pressure exceeds the pressure on the feed side of the membrane by about 1 psi.

23. The improved gas separation membrane unit of claim 17 wherein the sealing means comprises a ring of resilient material which is situated between the head portion of the poppet and a portion of the first end of the body which surrounds the outlet.

24. The improved gas separation membrane unit of claim 17 which further comprises a means for securing the second end of its body to the permeate conduit of a gas separation membrane unit having a permeate conduit and a membrane spirally wound about the conduit.

25. The improved gas separation membrane unit of claim 17 wherein the biasing means is a coil spring.

26. An improved gas separation apparatus comprising a containment vessel having an inlet port for a feed stream, an outlet port for a residual stream, an outlet port for a permeate stream, and a spiral wound gas separation membrane unit having a membrane and a permeate conduit which communicates with said permeate outlet, the improvement comprising a relief means for relieving the pressure on the permeate side of the mebrane when the permeate side pressure exceeds the pressure on the feed side of the membrane by a selected amount, without damaging the membrane.

27. The improved apparatus of claim 26 wherein the relief means is a device comprising:
  (a) a body secured within the contained vessel and having a first end, a second end and a continuous passage running from an inlet at the second end where it is in communication with the permeate side of the membrane to an outlet at the first end;
  (b) a poppet having a head sized to cover the passage outlet, said poppet movably mounted to the body such that it has a closed position where the head portion covers the pasaage outlet, and an open position where the outlet comes into communication with the feed side of the membrane and gas may pass through the passage, thereby relieving any differential between the permeate side and the feed side pressure;
  (c) biasing means for biasing the poppet to the closed position when the permeate side pressure does not exceed the pressure on the feed side by the selected amount, and for allowing the poppet to move to its open position when the permeate side pressure exceeds the pressure on the feed side of the membrane by the selected amount; and
  (d) sealing means for substantially preventing the flow of gas through the passage when the poppet is in its closed position.

28. The improved apparatus of claim 27 wherein the poppet has a stem and the body has an aperture to receive the stem such that the stem slides within the aperture as the poppet moves between its open and its closed positions; wherein the head portion of the poppet is disklike with a circular covering surface positioned toward the first end of the body; wherein the poppet stem is cylindrical and extends at right angle from the center of said covering surface; wherein the outlet is symmetrical with respect to the covering surface; wherein the sealing means comprises a resilient O-ring attached at the covering surface such that when the poppet is in its closed position, the O-ring is compressed between the poppet head portion and a portion of the first end of the body which surrounds the outlet; and wherein the portion of the first end contacted by the O-ring when the poppet is in its closed position is substantially coplaner such that the seal is substantially uniform.

29. The improved apparatus of claim 26 wherein the pressure is relieved before the amount by which the permeate side pressure exceeds the pressure on the feed side of the membrane reaches 5 psi.

* * * * *